US006208840B1

United States Patent
Norimatsu (10) Patent No.: US 6,208,840 B1
(45) Date of Patent: Mar. 27, 2001

(54) HANDY PHONE WITH AN INFRARED COMMUNICATION CAPABILITY

(75) Inventor: Noriko Norimatsu, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/240,260

(22) Filed: Jan. 29, 1999

(30) Foreign Application Priority Data

Jan. 30, 1998 (JP) .................................................. 10-018750

(51) Int. Cl.$^7$ ...................................................... H04B 7/00
(52) U.S. Cl. .......................... 455/66; 455/420; 455/414; 455/456; 379/56.3
(58) Field of Search ..................................... 455/420, 414, 455/421, 462, 465, 66, 456, 457, 558, 575, 466; 379/56.3, 56.1; 359/145, 136, 172, 152

(56) References Cited

U.S. PATENT DOCUMENTS

| 5,835,861 | * | 11/1998 | Whiteside | 455/466 |
|---|---|---|---|---|
| 5,835,862 | * | 11/1998 | Nykanen et al. | 455/558 |
| 5,903,833 | * | 5/1999 | Jonsson et al. | 455/417 |
| 5,914,796 | * | 6/1999 | Selin | 359/136 |
| 5,961,600 | * | 10/1999 | Ono et al. | 709/228 |
| 6,018,655 | * | 1/2000 | Chavez, Jr. et al. | 455/421 |
| 6,018,672 | * | 1/2000 | Werbus | 455/575 |
| 6,084,949 | * | 7/2000 | Yun | 379/56.3 |

FOREIGN PATENT DOCUMENTS

| 2-228139 | 9/1990 | (JP) . |
| 5-55683 | 7/1993 | (JP) . |
| 9-83443 | 3/1997 | (JP) . |

* cited by examiner

Primary Examiner—Nay Maung
Assistant Examiner—Sonny Trinh
(74) Attorney, Agent, or Firm—Scully, Scott, Murphy & Presser (57) ABSTRACT

A handy phone capable of performing infrared communication with an external apparatus is disclosed. As soon as the phone searching for the other station at the beginning of communication detects data via its infrared receipt section, it alerts the user of the detection of a bit error. Therefore, when the received data is free from a bit error, the phone can immediately inform the user of the phone of the fact that physical connection of the phone and the other station has no problems, even before a station location command is sent in all the slots. This eases the user's mind at the earliest possible stage. Further, the phone of the present invention is capable of immediately reporting the fact that the distance between infrared ports or the angle between the axes of the ports may not be adequate to the user, urging the user to correct the distance or the angle immediately.

8 Claims, 6 Drawing Sheets

HANDY PHONE WITH AN INFRARED COMMUNICATION CAPABILITY

BACKGROUND OF THE INVENTION

The present invention relates to a handy phone and more particularly to a handy phone capable of performing infrared communication with an external apparatus.

An infrared communication apparatus for performing communication within a preselected range by using infrared rays is conventional. Japanese Patent Laid-Open Publication No. 9-83443, for example, teaches an infrared communication apparatus including a receipt level determining section for determining the level of a signal come in through a receiving section, and a transmission output control section for controlling, based on the output of the receipt level determining section, a transmission output to be sent via a transmitting section. The function available with the infrared communication apparatus may be applied to a handy phone, as proposed in the past.

However, a conventional handy phone with an infrared communication capability has the following problems left unsolved. When the handy phone starts communicating with a peripheral apparatus, the former reports information received from the latter to the upper layer of firmware only after sending a station location command in all slots. On receiving this information, the upper layer informs the user of the phone of the presence/absence of a communicable station for the first time by using a visible message or sound. It therefore takes a long period of time for the user to see whether or not infrared communication can be held.

Assume that the distance between the infrared port of the phone station and that of the peripheral apparatus or the angle between the axes of the two ports is not adequate. Then, there may occur that the station location command does not reach the peripheral apparatus, that the station location command has reached the peripheral apparatus, but the phone does not detect any response, or that response data returned to the phone includes a bit error. In such a condition, the upper layer simply determines that a communicable station does not exist.

If a communicable station does not exist, as determined by the upper layer, the user of the phone recognizes the absence of such a station represented by a visible message or sound and must correct the relative position of the ports or the distance between the ports and again start communication all over again. Because the maximum number of slots available is sixteen and the maximum interval between consecutive slats is 500 ms, a long period of time is necessary for the setting condition to be transferred to the user. This renders the merits of infrared communication, which is cordless and not dependent on the configuration of a connector meaningless.

Technologies relating to the present invention are also disclosed in e.g., Japanese Patent Laid-Open Publication No. 2-228139 and Japanese Utility Model Laid-Open Publication No. 5-55683.

SUMMARY OF THE INVENTION

It is therefore an object of the present invention to provide a handy phone having an infrared communication capability and allowing the user of the phone to see whether or not infrared communication is possible as soon as possible.

It is another object of the present invention to provide a handy phone having an infrared communication capability and urging, when a bit error ascribable to the distance between infrared ports or the angle between the axes of ports occurs, the user of the phone to correct the distance or the angle as soon as possible.

In accordance with the present invention, a handy phone having, in addition to the original function of communicating with a base station by radio, a function of effecting infrared communication with an infrared transmitting and receiving section capable of transmitting data in the form of infrared rays and producing a received signal out of data received in the form of infrared rays includes a command transmitting section for sending, at the beginning of infrared communication, a station location command via the infrared transmitting and receiving section a preselected number of times at preselected time intervals. A detecting section determines, every time and just after the station location command has been sent, whether or not infrared data is received via the infrared, transmitting and receiving section. An error checking section determines, when infrared data is detected by the detecting section, whether or not the infrared data includes a bit error. A reporting section reports the result of decision output from the error checking section. An information storing section determines, if the infrared data does not include a bit error as determined by the error checking section, whether or not the infrared data is a station location response received from a desired station, and neglects, if the infrared date is not a station location response, the infrared data or stores, if the infrared data is a station location response, information of the desired station. A processing section ends, after sending the station location command the preselected number of times, processing for setting up a data link to the desired station or infrared communication processing on the basis of the information stored in the information storing section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
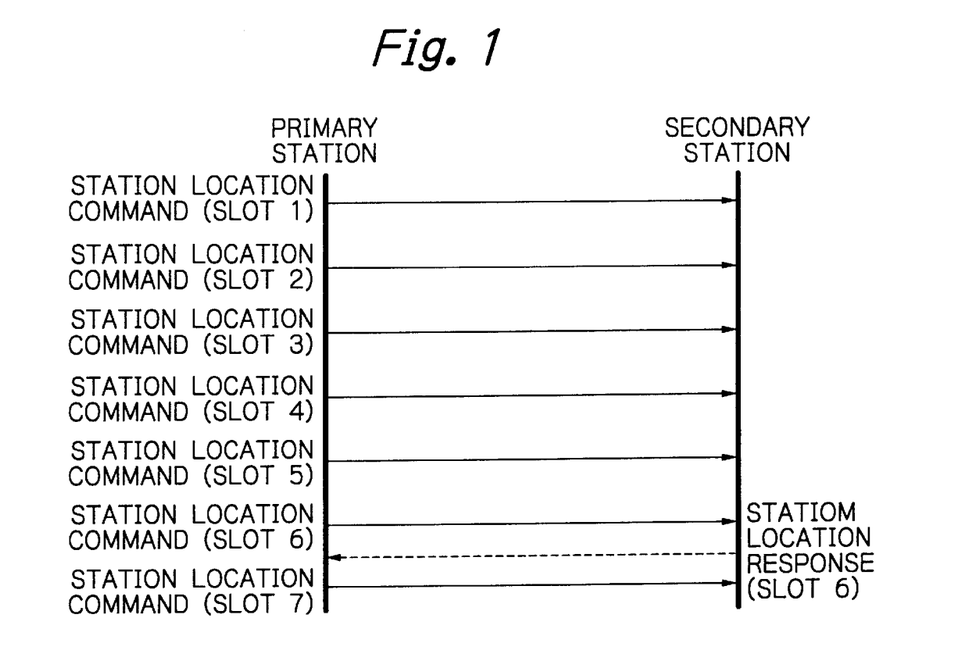
FIG. 1 shows a specific data interchange sequence effected between a handy phone with an infrared communication capability performing station location processing and a peripheral apparatus.

To better understand the present invention, reference will be made to FIG. 1 for describing a specific infrared communication procedure effected between a primary station required to set a data link and a secondary station. As shown, the primary station repeatedly sends a station location command in a preselected number of slots, e.g., one slot, six slots, eight slots or sixteen slots by using infrared rays, so that the secondary station can return a station location response to the primary station. The preselected number of slots begin with a slot #1. On receiving the station location command for the first time, the secondary station immediately returns, also by using infrared rays, a response to the primary station by using a slot number determined by the result of random number generation. This kind of procedure is executed in many of conventional infrared communication systems.

The primary station stores information included in the station location response received from the secondary station, again sends the command with the next slot number at a preselected time interval, end repeats the above procedure. If information of one or more secondary stations is present after the station location command has been sent in all the slots, the contents of the information are delivered to the upper layer of firmware as a second report.

Figure 2:
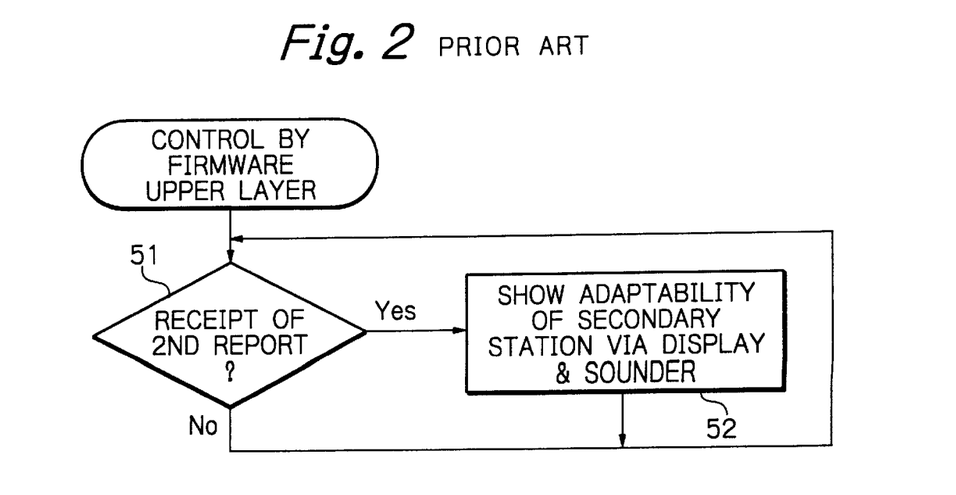
FIG. 2 is a flowchart demonstrating control executed by a conventional upper layer of firmware.

As shown in FIG. 2, the upper layer of firmware constantly determines whether or not the second report has been received (step 51). On receiving the second report, the upper layer checks communication service items supported by the secondary station. If any adequate service item is present, i.e., if the secondary station is adaptive to the primary station as to data transmission, upper layer outputs a message, e.g. "Start communication." via a display controller. At the same time, the upper layer outputs "pip, pip, pip" or similar tones via an alert controller, informing the user of the fact that a secondary station qualified in the aspect of the kind of data as well has been located (step 52). In addition, the upper layer informs even the module executing primary station communication start processing of the identifier of the desired secondary station and the kind of data to interchange and commands the module to set up a data link to the secondary station.

On the receipt of e.g., the above identifier, processing is switched from the infrared primary communication start processing to data link setting processing. If the identifier is not received, then the infrared communication processing is interrupted.

The above conventional handy phone with an infrared communication capability has the problems discussed earlier.

Figure 3:
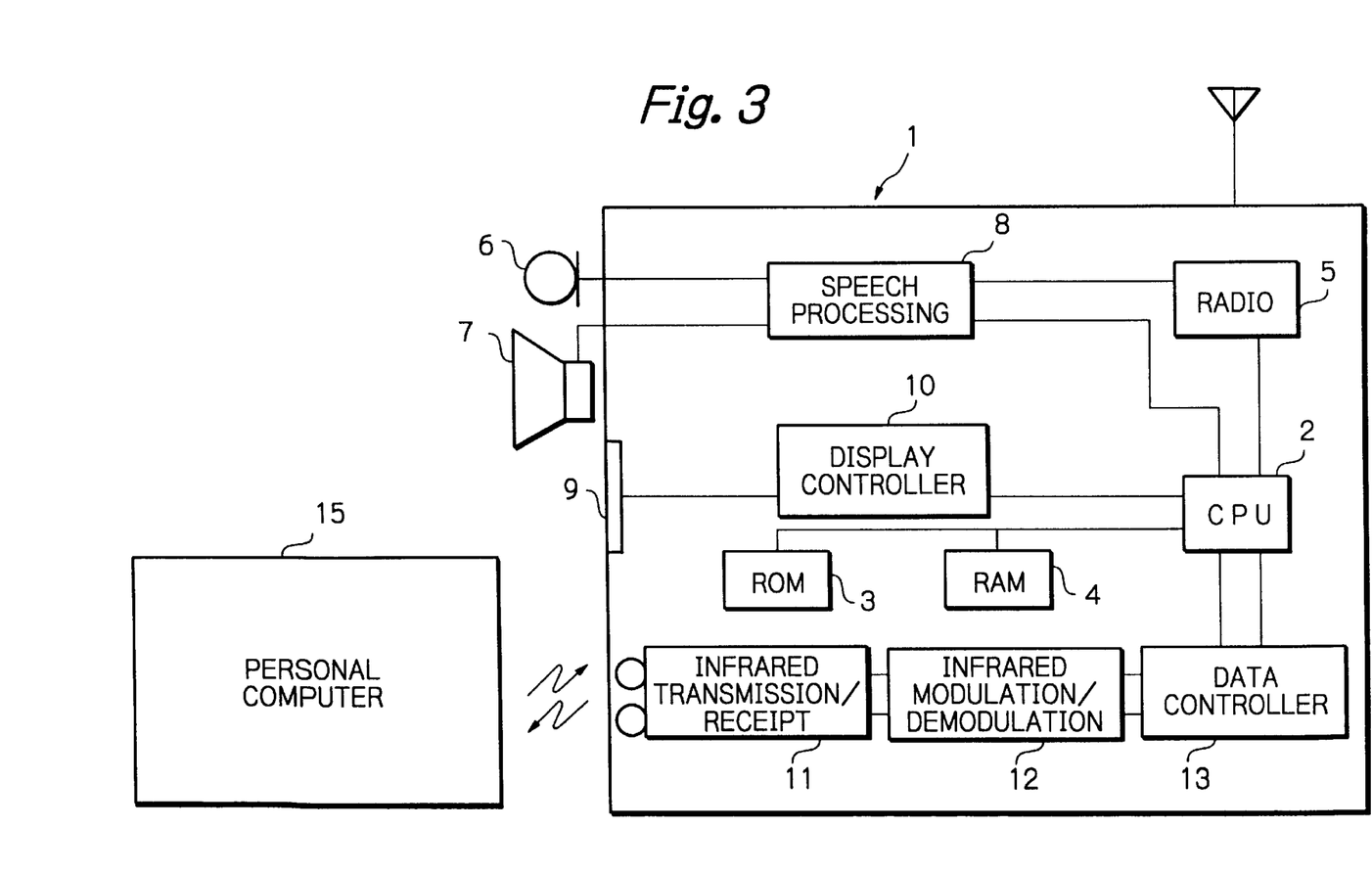
FIG. 3 is a block diagram schematically showing a handy phone embodying the present invention.

Referring to FIG. 3, a handy phone with an infrared communication capability embodying the present invention is shown and generally designated by the reference numeral 1. As shown, the handy phone 1 is generally made up of a control section assigned to the phone body and an infrared communication section.

The phone body control section includes a CPU (Central Processing Unit) 2 for collectively controlling the entire phone. A ROM (Read Only Memory) 3 stores beforehand a program describing the operation procedure of the CPU 2. A RAM 4 plays the role of a work area for the CPU 2. A radio 5 interchanges data with a base station not shown. A speech processing 8 executes digital processing with a speech signal input via a microphone 6 and a speech signal to be output via a speaker 7. The control section further includes a display 9 and a display controller 10 for controlling the display 9.

The infrared communication section includes an infrared transmission/receipt 11 made up of a transmitting section and a receiving section. The transmitting section drives an LED (Light Emitting Diode) for issuing infrared rays. The receiving section receives infrared rays with a photodiode and amplifies a received signal produced by photoelectric transduction. An infrared modulation/demodulation 12 has a modulating section for transforming a bit sequence to be sent in the form of infrared rays to preselected pulses, and a demodulating section for transforming the amplified received signal to a digital bit sequence. An infrared data controller 13 controls data conversion between the infrared modulation/demodulation 12 and the CPU 2 in order to implement an infrared protocol. If desired, the infrared data controller 13 may include a CPU therein in order to effect built-in software control.

The phone 1 with the above configuration is capable not only of communicating with a base station by radio, but also of communicating with, e.g., a personal computer (PC) 15 lying in the range of about 1 m or less by using infrared rays. With such an infrared communication capability, the phone 1 is allowed to, e.g., store the entire phone directory data generated by and stored in the PC 15 in the phone 1.

A specific operation of the illustrative embodiment will be described with reference to FIGS. 4 and 5 as well as to FIG. 1. As for a protocol for infrared communication, IrLAP issued from IrDA (Infrared Data Association) prescribes a protocol for setting up a one-to-multiple data link between infrared communication terminals. As shown in FIG. 1, the primary station expected to set up the data link sends a preselected number of slots, so that the secondary station can return a response.

Figure 4:
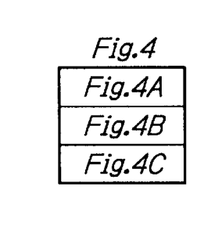
FIG. 4 is a flowchart showing a specific operation of the illustrative embodiment.
Figure 4A:
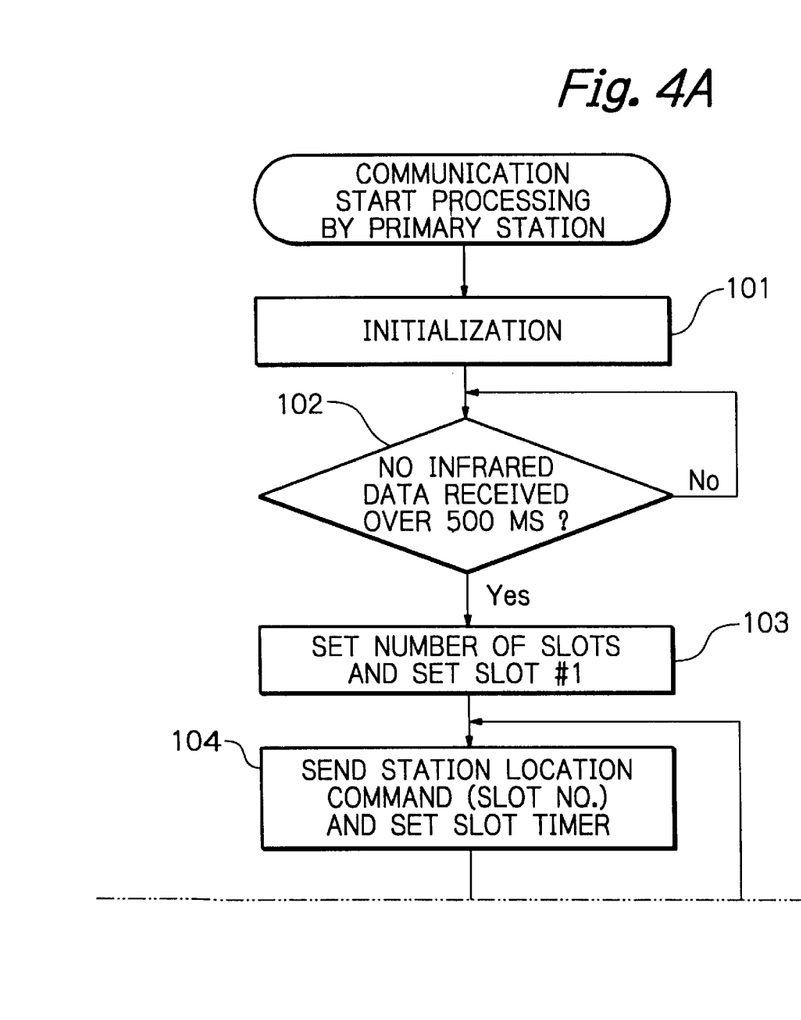
Figure 4B:
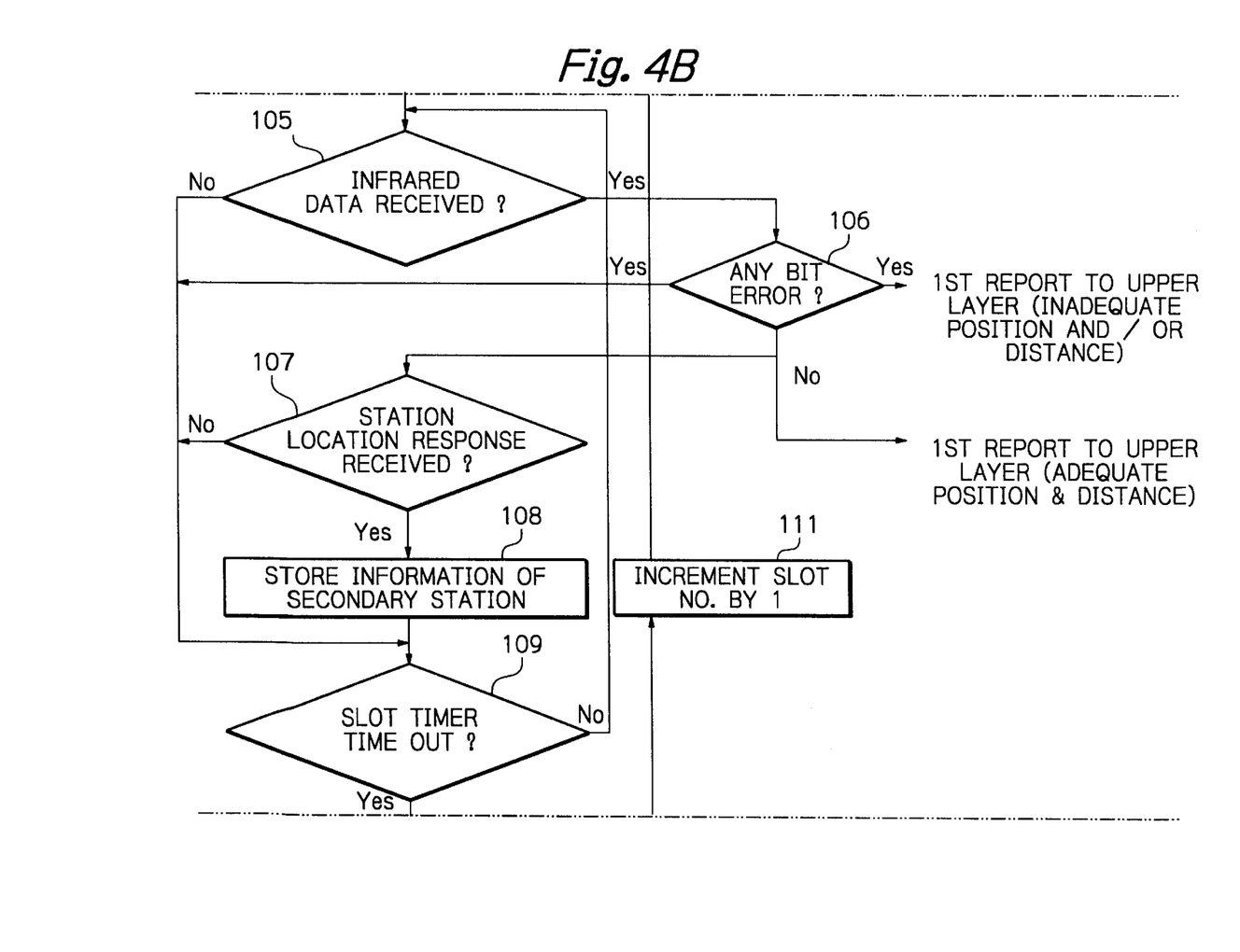
Figure 4C:
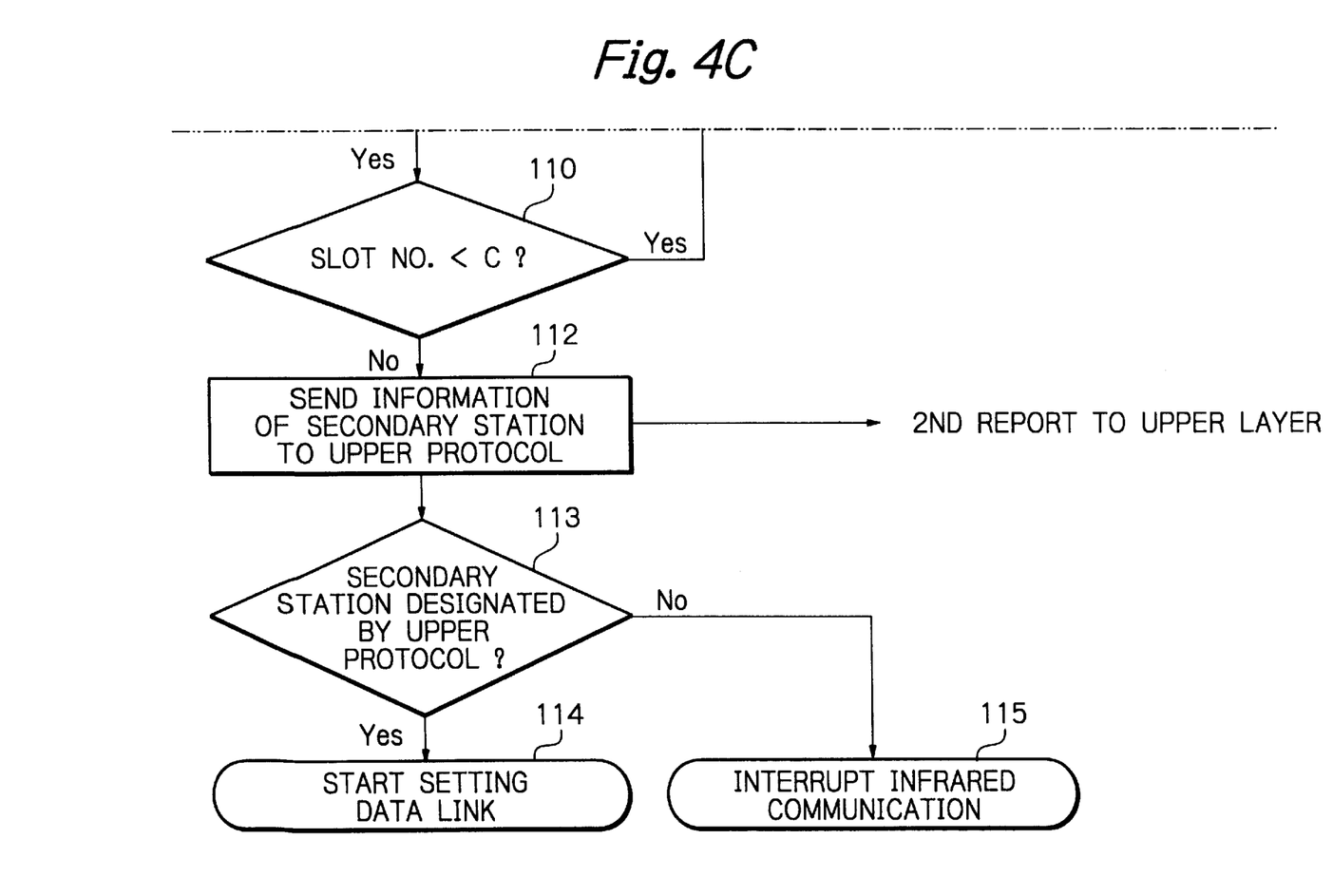

Specifically, as shown in FIG. 4, the CPU 2 of the phone or primary station 1 initializes the various sections of the phone 1 (step 101) and then determines whether or not infrared data is received over a period of time of 500 ms (step 102). This is prescribed by IrLAP and successful to prevent infrared communication under way from being obstructed.

If the answer of the step 102 is negative (No), the CPU 2 sets "1" as a slot number and sets the number of slots C to send (step 103). Subsequently, the CPU 2 causes the infrared transmission/receipt 11 to send a station location command in the slot #1 and sets a slot timer (step 104). After the step 104, the CPU 2 determines via the infrared transmission/receipt 11, infrared modulation/demodulation 12 and data controller 13 whether or not infrared data is received (step 105). If the answer of the step 105 is No, the CPU 2 determines whether or not the slot timer has counted a preselected period of time (step 109). If the answer of the step 105 is positive (Yes), the CPU 2 checks the received data to see if the data has any bit error or not (step 106).

If the answer of the step 106 is Yes, the CPU 2 sends a first report indicative of a problem relating to physical connection between the phone 1 and the other phone or secondary station to the upper layer of firmware which operates the CPU 2. At the same time, the CPU 2 advances to a step 109, neglecting the received data. As shown in FIG. 5, the upper layer of the firmware received the above first report causes the display controller 10 to display a message, e.g., "Position or distance is no good; please reorient the port or reduce distance," on the display 9. In addition, the upper layer alerts the user of the phone 1 to the above problem by causing the speech processing 8 to output "pips" or similar tone higher in frequency than a usual tone via the speaker 7 (steps 31 and 32).

On the other hand, if the answer of the step 106 is No, the CPU 2 sends to the upper layer the first report indicating the fact that physical connection using infrared rays is acceptable although the contents of communication are not matched. As shown in FIG. 5, in response to the first report, the upper layer causes the display controller 10 to display a message, e.g., "Position and distance are good; confirming contents of communication," on the display 9. At the same time, the upper layer causes the speech processing 8 to output "pips" or similar tone with the frequency of the usual tone via the speaker 7 (steps 31 and 32).

When the received data is free from bit errors, the CPU 2 determines whether or not the received data is a station location response (step 107), while executing the above operation. If the answer of the step 107 is No, then the CPU 2 determines whether or not the slot timer has counted the preselected period of time (step 109). If the answer of the step 107 is Yes, then the CPU 2 stores the information of the other station (step 108) and determines whether or not the slot timer has counted above period of time (step 109).

If the answer of the step 109 is No, then the CPU 2 returns to the step 105 to see if data is received or not. If the answer of the step 109 is Yes, the CPU 2 determines whether or not the current slot number is smaller than the number of slots C set in the step 103 (step 110). If the answer of the step 110 is Yes, then the CPU 2 increments the slot number by 1 (one) (step 111) and sends another station location command in the next slot #2 (step 104).

The CPU 2 repeats the above procedure, i.e., sends station location commands in the consecutive slats beginning with the slot #1 and occurring at preselected time intervals the number of times C via the infrared transmission/receipt 11 (steps 104–111). On receiving the station location command for the first time, the other station immediately returns a response to the phone 1 with a slot number determined by the result of random number generation.

As stated above, the phone or primary station 1 received data determines whether or not the data includes any bit error. If the received data is free from bit errors and is a station location response, the phone 1 stores information received from the secondary station (steps 107 and 108) and then sends another station location command in the next slot at the preselected interval (steps 109, 110, 111 and 104). If information sent from one or more secondary stations exist after all the slots have been sent (No, step 110), the CPU 2 sends the contents of the information to the upper layer of the firmware as a second report.

Figure 5:
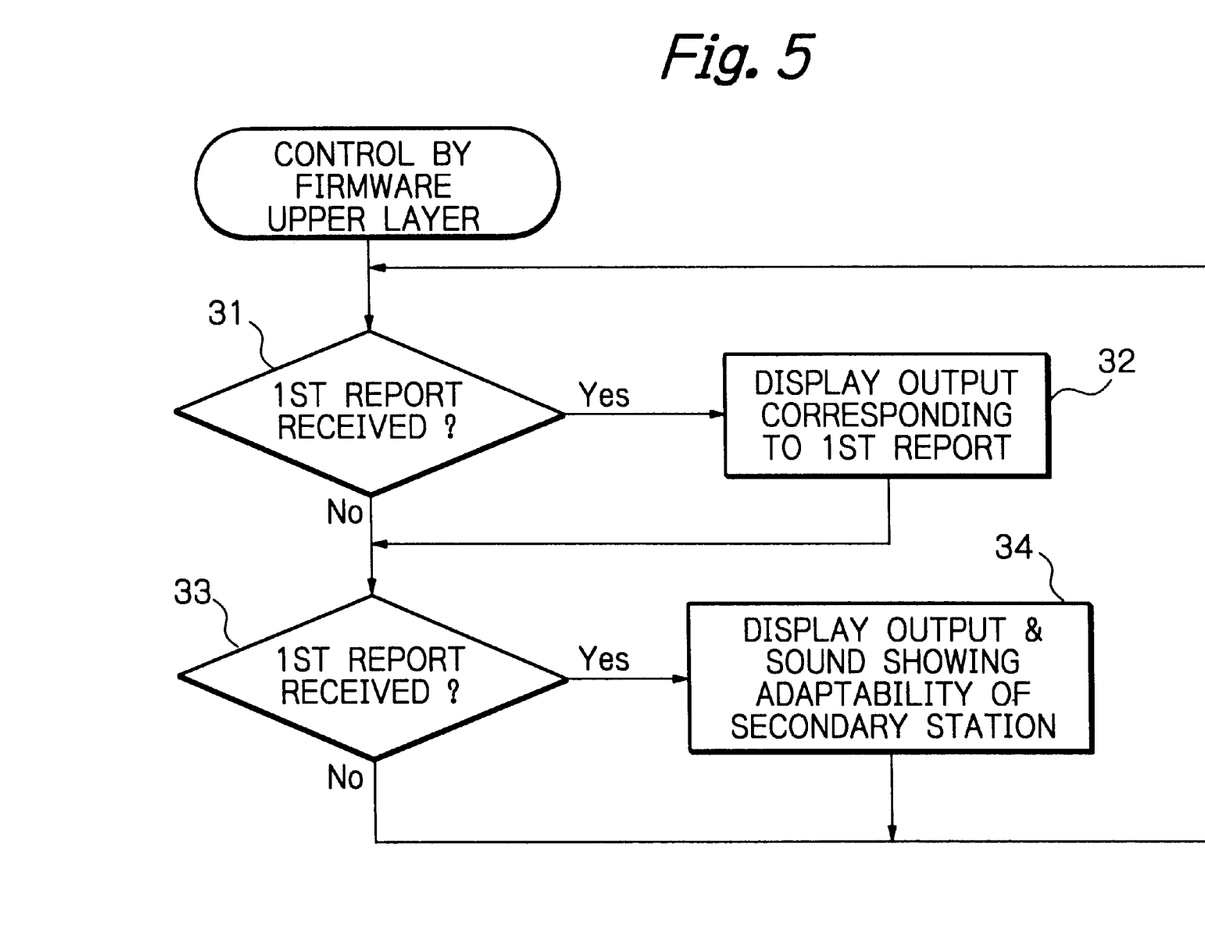
FIG. 5 is a flowchart showing control executed by the upper layer of firmware in the illustrative embodiment.

As shown in FIG. 5, on receiving the second report (Yes, step 33), the upper layer of the firmware checks, based on the information of the secondary station, communication service items supported by the secondary station. If any adequate service item is present, i e., if the secondary station is adaptive to the phone 1 as to data transmission, the CPU 2 causes the display controller 10 to display a message, e.g., "Start communication," on the display 9. At the same time, the CPU 2 causes the speech processing 8 to output "pip, pip, pip" or similar tones via the speaker 7. This informs the user of the fact that a secondary station qualified in the aspect of the kind of data as well has been located (step 34).

Subsequently, the CPU 2 determines whether or not the user has designated a desired secondary station in accordance with the identifier of a secondary station selected from an upper protocol and the kind of data to be sent (step 113). If an identifier, for example, designating a desired secondary station is received from the upper layer, the CPU 2 executes processing for setting up a data link (step 114); if otherwise, the CPU 2 interrupts the infrared communication processing (step 115).

In the manner described above, in the illustrative embodiment, whether or not infrared data is received is determined at the time of sending a station location command during communication start processing. When data is received, whether or not the received data includes a bit error is determined. If the data is free from a bit error, the fact that a secondary station to communicate by infrared rays is reported to the user by a visible message and sound. If the data includes a bit error, the fact that the distance between the infrared ports or the angle between the axes of the parts may not be adequate is reported to the user by a visible message and sound. The user can therefore correct the above distance or angle immediately.

In summary, in accordance with the present invention, as soon as a handy phone searching for the other station at the beginning of communication detects data via its infrared receipt section, it informs alerting means of the result of decision on a bit error. Therefore, when the received data is free from a bit error, the phone can immediately inform the user of the phone of the fact that physical connection of the phone and the other station has no problems, even before a station location command is sent in all the slots. This eases the user's mind at the earliest possible stage.

Further, the phone of the present invention is capable of immediately reporting the fact that the distance between infrared ports or the angle between the axes of the ports may not be adequate to the user, urging the user to correct the distance or the angle immediately.

The present invention therefore noticeably improves the conventional circumstance in which a long period of time is necessary for the user to see whether or not connection is acceptable, due to the maximum number of slots of sixteen and the maximum slot interval of 5 ms.

Various modifications will become possible for those skilled in the art after receiving the teachings of the present disclosure without departing from the scope thereof. For example, to show the user whether or not the position and distance of the phone 1 is adequate, only one of the sound to be output via the speaker 7 and the message to be displayed on the display 9 originally available with the phone 1 may be used. Alternatively, a vibrator or similar alerting means also originally available with the phone 1 for alerting the user to the receipt of a call may be used for the same purpose.

What is claimed is:

1. A handy phone having, in addition to an original function of communicating with a base station by radio, a function of effecting infrared communication with an infrared transmitting and receiving section capable of transmitting data in a form of infrared rays and producing a received signal out of data received in a form of infrared rays, said handy phone comprising:

command transmitting means for sending, at a beginning of infrared communication, a station location command via said infrared transmitting and receiving section a preselected number of times at preselected time intervals;

detecting means for determining, every time and just after the station location command has been sent, whether or not infrared data is received via said infrared transmitting and receiving section;

error checking means for determining, when infrared data is detected by said detecting means, whether or not said infrared data includes a bit error;

reporting means for reporting a result of decision output from said error checking means;

information storing means for determining, if the infrared data does not include a bit error as determined by said error checking means, whether or not said infrared data is a station location response received from a desired station, and neglecting, if said infrared data is not a station location response, said infrared data or storing, if said infrared data is a station location response, information of said desired station; and processing means for ending, after sending the station location command the preselected number of times, processing for setting up a data link to the desired station or infrared communication processing on the basis of the information stored in said information storing means.

2. A handy phone as claimed in claim 1, wherein said reporting means reports, when the infrared data includes a bit error as determined by said error checking means, that a position of said handy phone relative to the desired station or a distance between said handy phone and said desired station is not adequate or reports, when said infrared data does not include a bit error, that said desired station is located.

3. A handy phone as claimed in claim 2, wherein said processing means sets up, when the desired station is designated by an upper protocol, the data link to said desired station or interrupts, when said desired station is not designated, the infrared communication processing.

4. A handy phone as claimed in claim 2, wherein said reporting means comprises alerting means for causing sounding means originally included in said handy phone for telecommunication to output a tone.

5. A handy phone as claimed in claim 1, wherein said processing means sets up, when the desired station is designated by an upper protocol, the data link to said desired station or interrupts, when said desired station is not designated, the infrared communication processing.

6. A handy phone as claimed in claim 1, further comprising adaptability checking means for determining, after the station location command has been sent the preselected number of times, whether or not the desired station is adaptive to said handy phone on the basis of said information stored in said information storing means, and causing said reporting means to report a result of a decision.

7. A handy phone as claimed in claim 6, wherein said reporting means comprises alerting means for causing sounding means originally included in said handy phone for telecommunication to output a tone.

8. A handy phone as claimed in claim 1, wherein said reporting means comprises alerting means for causing sounding means originally included in said handy phone for telecommunication to output a tone.

* * * * *